US009777126B2

(12) United States Patent
Williams et al.

(10) Patent No.: US 9,777,126 B2
(45) Date of Patent: Oct. 3, 2017

(54) AEROGEL / POLYMER COMPOSITE MATERIALS

(75) Inventors: Martha K. Williams, Titusville, FL (US); Trent M. Smith, Melbourne, FL (US); James E. Fesmire, Titusville, FL (US); Luke B. Roberson, Titusville, FL (US); LaNetra M. Clayton, Oviedo, FL (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 0 days.

(21) Appl. No.: 12/834,416

(22) Filed: Jul. 12, 2010

(65) Prior Publication Data
US 2010/0279044 A1  Nov. 4, 2010

Related U.S. Application Data

(62) Division of application No. 11/740,357, filed on Apr. 26, 2007.

(60) Provisional application No. 60/746,326, filed on May 3, 2006.

(51) Int. Cl.
C08J 5/04 (2006.01)
(52) U.S. Cl.
CPC ............ C08J 5/04 (2013.01); *C08J 2377/00* (2013.01); *Y10T 428/1376* (2015.01); *Y10T 428/249969* (2015.04); *Y10T 428/25* (2015.01)
(58) Field of Classification Search
USPC ........................................ 524/492, 493, 445
See application file for complete search history.

(56) References Cited

U.S. PATENT DOCUMENTS

| | | | | | |
|---|---|---|---|---|---|
| 2,428,608 | A | * | 10/1947 | Bass | 174/350 |
| 2,482,276 | A | * | 9/1949 | Hyde et al. | 528/14 |
| 2,635,929 | A | * | 4/1953 | Brophy et al. | 384/42 |
| 3,006,878 | A | * | 10/1961 | Talcott | 524/500 |
| 3,324,060 | A | * | 6/1967 | Scopp et al. | 524/219 |
| 3,584,090 | A | * | 6/1971 | Parrish | 264/45.9 |
| 4,387,196 | A | * | 6/1983 | Bonnet et al. | 525/477 |
| 4,388,449 | A | * | 6/1983 | Bonnet et al. | 525/477 |

(Continued)

FOREIGN PATENT DOCUMENTS

EP    1 674 513    6/2006
WO    WO98/07780   2/1998

(Continued)

OTHER PUBLICATIONS

Technical report for Butvar (polyvinyl butyral resin) from Eastman, 32 pages, 2013.*

(Continued)

*Primary Examiner* — Robert S Loewe
(74) *Attorney, Agent, or Firm* — Jonathan J. Leahy; Michelle L. Ford; Mark P. Dvorscak

(57) ABSTRACT

The invention provides new composite materials containing aerogels blended with thermoplastic polymer materials at a weight ratio of aerogel to thermoplastic polymer of less than 20:100. The composite materials have improved thermal insulation ability. The composite materials also have better flexibility and less brittleness at low temperatures than the parent thermoplastic polymer materials.

15 Claims, 6 Drawing Sheets

(56) References Cited

U.S. PATENT DOCUMENTS

| | | | |
|---|---|---|---|
| 4,954,327 A * | 9/1990 | Blount | C01B 33/1585 |
| | | | 106/18.12 |
| 5,124,364 A * | 6/1992 | Wolff | C08J 9/35 |
| | | | 521/55 |
| 5,294,480 A * | 3/1994 | Mielke | B01J 13/0091 |
| | | | 423/335 |
| 5,306,555 A | 4/1994 | Ramamurthi et al. | |
| 5,565,142 A | 10/1996 | Deshpande et al. | |
| 5,569,513 A * | 10/1996 | Fidler | C08J 9/0066 |
| | | | 428/304.4 |
| 5,656,195 A * | 8/1997 | Mielke | C04B 14/064 |
| | | | 106/38.3 |
| 5,680,713 A | 10/1997 | Forbert et al. | |
| 5,795,556 A | 8/1998 | Jansen et al. | |
| 5,948,314 A * | 9/1999 | Geiss | C04B 14/06 |
| | | | 106/287.11 |
| 6,143,400 A * | 11/2000 | Schwertfeger | C04B 14/064 |
| | | | 252/62 |
| 6,516,537 B1 | 2/2003 | Teich et al. | |
| 6,598,358 B1 * | 7/2003 | Schwertfeger | E04B 1/74 |
| | | | 181/284 |
| 6,887,563 B2 * | 5/2005 | Frank | C04B 28/26 |
| | | | 428/312.6 |
| 7,074,880 B2 | 7/2006 | Rhine et al. | |
| 7,144,522 B2 | 12/2006 | Burchill, Jr. et al. | |
| 2003/0082396 A1 | 5/2003 | Koslow | |
| 2005/0100728 A1 | 5/2005 | Ristic-Lehmann et al. | |
| 2005/0148692 A1 * | 7/2005 | Burchill, Jr. | C09D 5/028 |
| | | | 523/218 |
| 2006/0194048 A1 * | 8/2006 | Van Rooy | 428/372 |
| 2006/0264132 A1 | 11/2006 | Leeser et al. | |
| 2008/0132632 A1 * | 6/2008 | Schiraldi et al. | 524/445 |

FOREIGN PATENT DOCUMENTS

| | | |
|---|---|---|
| WO | WO02/088587 | 11/2002 |
| WO | WO2006/024010 | 3/2006 |
| WO | WO2006/127182 | 11/2006 |
| WO | WO2007/021493 | 2/2007 |

OTHER PUBLICATIONS

Schmidt et al. "Applications for silica aerogel products" Journal of Non-Crystalline Solids, 1998, 225, 364-368.*

Kistler, S.S. 1932. Coherent expanded-aerogels. Journal of Physical Chemistry 36 pp. 52-64.

Gesser and Goswanni. 1989. Aerogels and Related Porous Materials. Chem. Rev. vol. 89, pp. 765-788.

Pekala, R.W. 1989. Organic aerogels from the polycondensation of resorcinol with formaldehyde. Journal of Material Science 24, pp. 3221-3227.

Stewart, Richard. 2007. Wood Fiber Composites. Plastics Engineering, Feb. 2007, pp. 20-27.

Rigacci, A. et al. 2004. Preparation of polyurethane-based aerogels and xerogels for thermal superinsulation. Journal of Non-crystalline Solids 350, pp. 372-378.

Eastman, Butvar B-76 Safety Data Sheet, revision date May 22, 2015.

* cited by examiner

AEROGEL / POLYMER COMPOSITE MATERIALS

CROSS-REFERENCE TO RELATED APPLICATIONS

This application is a divisional application claiming the benefit of U.S. patent application Ser. No. 11/740,357 filed on Apr. 26, 2007, which further claims the benefit under 35 U.S.C. 119(e) of U.S. Provisional Application Ser. No. 60/746,326 filed May 3, 2006, the contents of which are incorporated herein by reference.

ORIGIN OF THE INVENTION

The invention described herein was made by employees of the United States Government and may be manufactured and used by and for the Government of the United States of America for governmental purposes without the payment of any royalties thereon or therefor.

BACKGROUND OF THE INVENTION

Typical thermal conductivity values of plastics range between 0.600 W/m-K down to around 0.150 W/m-K depending on the type of polymer. Compared to metals that range from 200 W/m-K to 15 W/m-K and ceramic borosilicate glass that is around 1 W/m-K, plastics are good heat insulators. On the other hand, compared to cellular solids such as polyurethane and polystyrene foams which have thermal conductivity values around 0.025 W/m-K, plastics are remarkable heat conductors. Therefore on a material basis, it can be concluded that plastics are neither terrific conductors of heat nor great heat insulators. Similarly in the case of mechanical strength, structural plastic materials fall between metals and foams in strength and modulus. There is a significant advantage to be gained in the thermoplastics industry if plastics could be easily made into better heat insulators since in many applications heat flow is not desired and the mechanical properties of cellular solids are not acceptable. Polymers also typically do not perform well at low temperatures or under cryogenic conditions due to their brittleness at these temperatures. Therefore, metals are usually used instead of plastics in cryogenic conditions due to their better performance at low temperatures. Since polymers are much lighter in weight compared to metals, as well as being easier to process, improving thermal performance properties of plastics would be economically and industrially preferred for such applications. New polymer compositions with improved physical properties for certain applications are needed.

SUMMARY OF THE INVENTION

The invention involves the discovery that mixing even a small amount of aerogel, e.g., 5%, with a polymer material significantly decreases the thermal conductivity of the polymer material (i.e., makes it a better insulator) without substantially changing the strength of the unmodified polymer. Adding a small amount of aerogel to the polymer material also surprisingly results in a composite material that is more elastic and less brittle at cryogenic temperatures than the unmodified polymer material.

One embodiment of the invention provides a composite material comprising: (a) an aerogel blended with (b) a thermoplastic polymer material; wherein the weight ratio of the aerogel to thermoplastic polymer in the composite material is less than 20:100.

Another embodiment of the invention provides a composite material comprising: (a) an aerogel blended with (b) a thermoplastic polymer material; wherein the weight ratio of the aerogel to thermoplastic polymer in the composite material is less than 20:100; and wherein the composite material is opaque.

Another embodiment provides a composite material comprising: (a) an aerogel blended with (b) a thermoplastic polymer material; wherein the volume ratio of the aerogel to thermoplastic polymer in the composite material is less than 5:95.

Another embodiment of the invention provides a composite material comprising: (a) an aerogel blended with (b) a thermoplastic polymer material; wherein the weight ratio of the aerogel to thermoplastic polymer in the composite material is less than 20:100; and wherein the composite material has a thermal conductivity less than 75% of the thermal conductivity of the thermoplastic polymer material and has a yield strength that differs by no more than 15% from the yield strength of the thermoplastic polymer material.

Another embodiment of the invention provides an article of manufacture comprising the composite material.

Another embodiment of the invention provides a method of use of an aerogel comprising blending the aerogel with a thermoplastic polymer material to create a composite material that is a better thermal insulator than the polymer material, wherein the weight ratio of the aerogel to thermoplastic polymer in the composite material is less than 20:100.

Another embodiment of the invention provides a method of use of an aerogel comprising: blending the aerogel with a thermoplastic polymer material to create a composite material that is less brittle than the polymer material; wherein the composite material and the thermoplastic polymer material each have a storage modulus, and the storage modulus of the composite material at 223 K is less than 75% of the storage modulus of the thermoplastic polymer material at 223 K.

Another embodiment of the invention provides a method of improving the thermal performance of a thermoplastic polymer material without impairing its strength comprising: blending an aerogel with the thermoplastic polymer material to generate a composite material having a thermal conductivity that is less than 75% of the thermal conductivity of the thermoplastic polymer material and having a yield strength that differs by no more than 15% from the yield strength of the thermoplastic polymer material.

Another embodiment of the invention provides a method of decreasing low-temperature brittleness of a thermoplastic polymer material comprising: blending an aerogel with the thermoplastic polymer material to generate a composite material having a storage modulus at 223 K that is less than 75% of the storage modulus of the thermoplastic polymer material at 223 K.

DETAILED DESCRIPTION OF THE INVENTION

Figure 1:
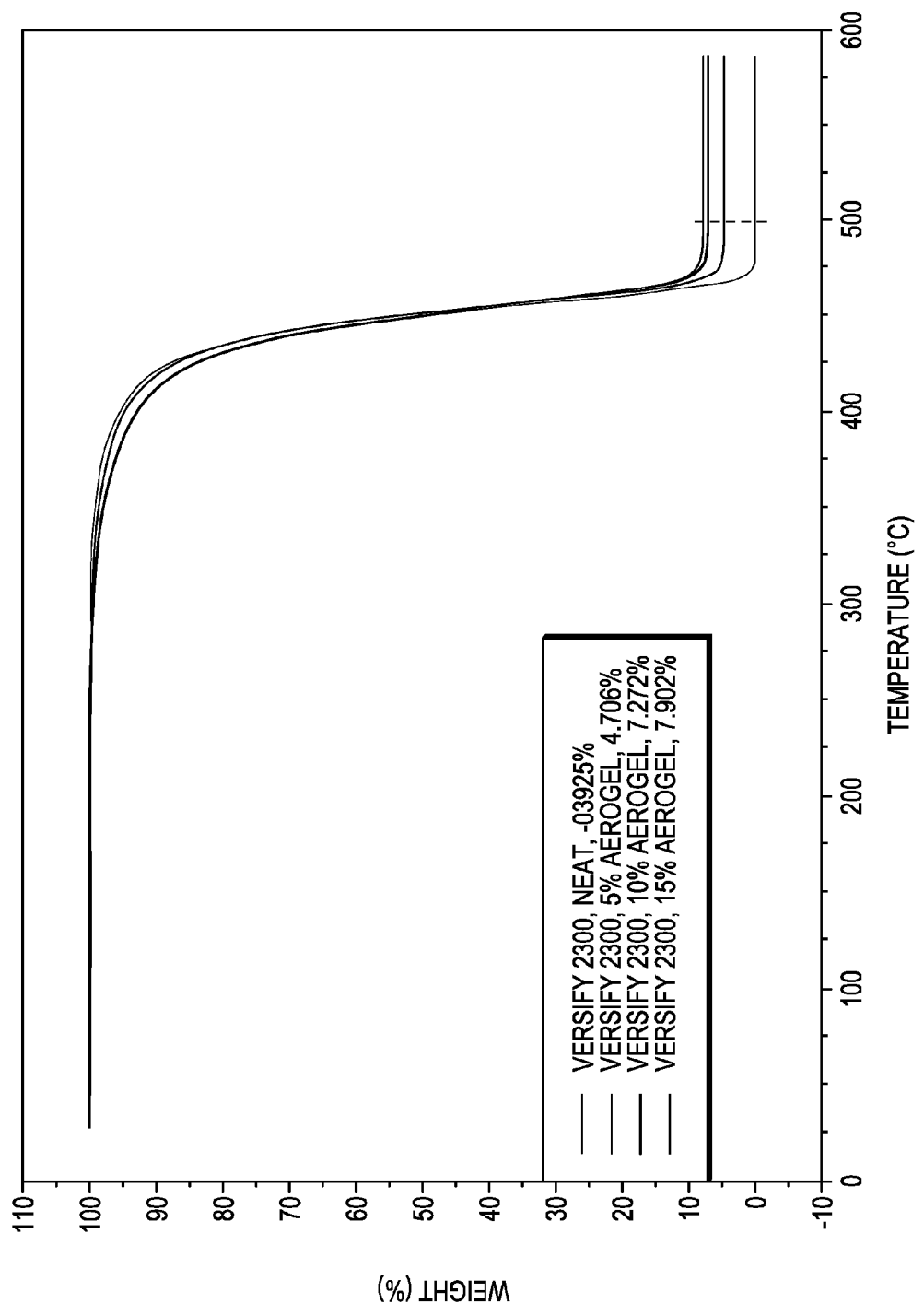
FIG. 1 is a plot of results of thermogravimetric analysis (TGA) of neat VERSIFY 2300 and aerogel-VERSIFY composites containing 5%, 10%, and 15% aerogel.

As used herein, the term "thermoplastic polymer material" refers to a material having a thermoplastic polymer as a major component by volume or weight. The thermoplastic polymer material may include other components, such as metals, or fibers composed of a non-thermoplastic polymer, or nanoscale particles composed of a material other than a thermoplastic polymer. In specific embodiments, the "thermoplastic polymer material" is at least 20%, at least 30%, at least 50%, or at least 60% thermoplastic polymer by weight.

The term "thermoplastic polymer material" as used herein also refers to a material otherwise identical to the composite material but lacking any aerogel, particularly in the context of trait comparisons between the composite material and the thermoplastic polymer material.

The term "yield strength" as used herein is synonymous with the term "yield stress" and refers to the minimum tensile stress required to create plastic deformation of an object.

As used herein, the term "aerogel" refers to a highly porous material of low density, which is prepared by forming a gel and then removing liquid from the gel while substantially retaining the gel structure. Aerogels have open-celled microporous or mesoporous structures. Typically, they have pore sizes of less than 200 nm and surface areas of greater than 100 m$^2$ per gram. They often have low densities, e.g., from 200 mg/cc down to as little as 1 mg/cc.

According to a narrower definition, aerogels are materials in which the liquid has been removed from the gel under supercritical conditions. Most commonly the liquid is removed with supercritical carbon dioxide. The term "xerogel" as used herein refers to a type of aerogel in which the liquid has been removed from the gel by a process other than supercritical fluid extraction, including drying under subcritical conditions or removal of the liquid from the frozen state by sublimation.

The pores in the aerogels used in the present invention are typically filled with air. They can also be filled with other desired gases. Alternatively, the gases can be removed from the aerogel under vacuum.

The most common aerogel material is silica ($SiO_2$). Other materials can be used, including other metal oxides such as alumina ($Al_2O_3$), carbon, and polymers such as polyimide.

Aerogels are commercially available from several sources. Aerogels prepared by supercritical fluid extraction or by subcritical drying are available from Cabot Corp. (Billerica, Mass.), Aspen Aerogel, Inc. (Northborough, Mass.), Hoechst, A.G. (Germany), and American Aerogel Corp. (Rochester, N.Y.).

Aerogels can be prepared by methods well known in the art. Briefly, a gel is prepared, then fluid is removed by any suitable method that substantially preserves the gel structure and pore size. The method of fluid removal can be supercritical fluid extraction, evaporation of liquid, or freeze-drying. The gel can be cast in particles to match the desired final aerogel particle size. But more typically, a large gel will be formed, the fluid removed from it to form a large aerogel, and then the large aerogel can be broken or otherwise processed into particles of the desired size.

As examples, particular specific methods of preparing aerogels will now be described. In one technique, silica gels can be prepared by pouring slowly with stirring a sodium silicate ($Na_2SiO_3$) solution of specific density 1.15 in water into an equal volume of 6 M HCl. The solution is allowed to gel in dishes for 24 hours at room temperature, then washed with water until no chloride ion is found in the wash water. The gel may then be washed with ethanol and then the ethanol removed by heating under pressure to above the critical temperature and then removing the supercritical alcohol. Alternatively, liquid in a gel can be removed with supercritical carbon dioxide. In this process, if necessary, the gel is washed to replace liquid in the gel with a liquid that is miscible with $CO_2$ (e.g., water, dimethylsulfoxide, acetone, methanol, amyl alcohol, etc.). The gel is then washed with $CO_2$ at a temperature and pressure above the critical point, e.g., 37° C. and 82 bar. Slow isothermal depressurization is then used to remove the $CO_2$, e.g., 0.05 bar/min at 37° C.

In another method, a final solution of 0.29 M resorcinol, 0.57 M formaldehyde, and 1.5 mM $Na_2CO_3$ is prepared and sealed into ampules. The sealed ampules are placed in an oven at 85° C. for 7 days. The ampules are then cooled and broken to remove the gel. The gel may be washed with acetone, and the acetone then removed from the gel with evaporation at subcritical temperatures and pressures (Pekala, J., 1989, Material Sci. 24:3221-3227).

In another method, an organic or inorganic gel having surface ROH groups is treated in the wet state with a surface modifying agent of the formula $R_xMX_y$, where R is an organic group, M is Si or Al, and X is a halogen. An example is trimethylchlorosilane. The surface modifying agent decreases the surface tension of the liquid in the gel, allowing the liquid to be evaporated without shrinking the gel.

Other aerogels and methods to prepare them are described in, e.g., Rigacci, 2004, *J. Non-crystalline Solids* 350:372-378; U.S. Pat. No. 5,795,556, U.S. Pat. No. 5,680,713; U.S. Pat. No. 5,306,555; and U.S. Pat. No. 7,074,880.

Aerogels are excellent thermal insulators. They minimize conduction because of the tortuous path through the aerogel nanostructure. They minimize convection because of the small pore sizes. If doped with infrared-suppressing dopants, they may also minimize radiative heat transfer; however, aerogels are often very brittle and fragile, which limits their utility in some applications.

Aerogels that are formed by supercritical fluid extraction are usually superior to xerogels (formed using other methods of liquid removal) in being somewhat better insulators, more lightweight, and having greater surface area. This is because supercritical fluid extraction usually better preserves the gel structure as compared to other methods of liquid removal from gels. But supercritical fluid extraction requires extremes of pressure and/or temperature, and it is easier and less expensive to remove liquid from gels by other means, i.e., to form xerogels. And the properties of xerogels can often be made very close to the properties of aerogels formed by supercritical fluid extraction.

The present invention is directed to new polymeric composite materials with enhanced thermal insulation properties compared to the base polymer matrix and with improved or similar other physical properties compared to the base polymer matrix. The composite materials are useful in food service, racing, aerospace, textile, electronic, and military industries. More particularly, they can be used in food packaging and other storage containers, tanks, pipes, valves, components, structural supports, and garments, as well as other similar mechanical devices and cold or hot fluid process systems.

The polymeric compositions of the present invention can be cost effectively manufactured and are adaptable for low temperature and other uses, including heat transfer reduction at higher temperatures if the base polymer is usable at the high temperatures (i.e., has suitable physical properties and durability at the high temperatures).

The present invention is directed to new composite materials that combine an aerogel filler material, in relatively small amounts, with a thermoplastic polymer matrix. Fabrication of the composites results in polymeric materials with improved thermal insulating properties, improved attenuation of acoustic energy, and improved low-temperature performance.

The composite materials contain an aerogel blended with a thermoplastic polymer material. By use of the term "blended with" it is meant that the aerogel is uniformly dispersed in the thermoplastic polymer material or in the thermoplastic polymer portion of the thermoplastic polymer material, where the thermoplastic polymer material contains other components. This contrasts with a less intimate association of the aerogel with a thermoplastic polymer material, such as a layer of aerogel physically sandwiched between two layers of thermoplastic polymer material. The term "blended with" does not refer necessarily to a process of production.

The aerogel of the composite materials in one embodiment is an inorganic aerogel.

In one embodiment, the aerogel is or includes silica aerogel.

In one embodiment, the aerogel is or includes a metal oxide aerogel.

In one embodiment, the aerogel is or includes a carbon aerogel or a polymeric aerogel.

In one embodiment, the aerogel is a xerogel.

In another embodiment, the aerogel is formed by a process comprising supercritical fluid extraction of a gel.

Examples of suitable thermoplastic polymers for inclusion in the composites include polycarbonate; polyamides (nylon), e.g., Mitsubishi MXD6, or ZYTEL (alternatively referred to as "PA66"); polyolefins, e.g., HDPE, PP, Mitsui TPX or PMP, VERSIFY, or CRYSTALOR; polyacetals, e.g. DELRIN; polyesters, e.g., BIOPOL, DACRON, or polycarbonates, e.g., LEXAN; poly(ether sulfones), e.g., UDEL; conducting polymers, e.g., ZYPAN or Ligno-PANI; acrylic polymers, e.g., LUCITE; polyanilines, polyimides such as TORLON or ULTEM; polyketones, such as KADEL or VICTREX; polysulfides, e.g., RYTON; vinyl polymers, e.g., XAREC or polystyrene; polyethers; polysilicones, polyheterocyclics; polyethylenes; polyureas; polyurethanes; liquid crystal polymers, e.g. VECTRA; and derivatives thereof. Other similar polymers can likewise be used.

In particular embodiments, the polymer material comprises a polyolefin, a polyester, a polyamide, a polyether, a polyurethane, an acrylic polymer, a polyimide, a polyurea, a polypyrrole, a polythiophene, a polyanaline, an acrylic polymer, a vinyl polymer, a polysiloxane, a polysulfide, or copolymers or mixtures thereof.

In a particular embodiment, the polymer material comprises nylon.

In another particular embodiment, the polymer material comprises a polyolefin.

In particular embodiments, the polymer is not perhalogenated or is not polytetrafluoroethylene.

In one embodiment of the present invention, the thermoplastic material (which may be, e.g., a pure thermoplastic polymer, a polymer mixture, and/or a thermoplastic elastomer) is dry mixed with aerogel beads or particles, forming a dry blend. In another embodiment, the thermoplastic, thermoplastic blend, and/or elastomer is premixed and pelletized prior to being dry mixed with aerogel beads or particles.

In one embodiment, the dry blend is melt-extruded, preferably in a twin screw extruder, such as a BRABENDER MARK II conical twin-screw extruder and PREP CENTER with adjustable temperature zones, or solution processed resulting in an organic/inorganic composite.

The aerogel is preferably mixed with the thermoplastic polymer material by a process comprising melt extrusion. Alternatively, the aerogel can be mixed with the polymer material by a process comprising dissolving the polymer material in a solvent. Dissolving the polymer enables the composite material to be wet spun into fibers or cast into sheets.

The new composites can also be melt-spun into fibers, extruded into tapes, injection molded, blow molded, and/or compression molded into any usable shape or form.

The aerogel in the composite materials is preferably in the form of particles of 10 mm diameter (i.e., the longest dimension, whether or not the particles approximate spheres) or less. More preferably, the aerogel is in the form of particles of 1 mm diameter or less. In some embodiments, the aerogel is in the form of particles of 0.1 mm diameter or less.

The composite material may be in any suitable form, including fibers, sheets, blocks, tubes, or rolls.

In one embodiment, the composite material is in the form of sheets, blocks, tubes, or rolls.

In one embodiment, the composite material is not fibrous. In another embodiment, the composite material is not a curable film.

The weight ratio of the aerogel to thermoplastic polymer (i.e., the weight of thermoplastic polymer in the thermoplastic polymer material, which may not be all of the weight of the thermoplastic polymer material) in the composite material is preferably less than 15:100. In particular embodiments, it is less than 12:100, less than 10:100, less than 8:100, less than 6:100, less than 4:100, or less than 2:100.

In particular embodiments, the weight ratio of the aerogel to thermoplastic polymer in the composite material is less than 5:95. In other embodiments, it is less than 4:96, 3:97, 2:98, or 1:99.

The volume ratio of the aerogel to the thermoplastic polymer material in the composite material is preferably less than 1:1. In particular embodiments, it is less than 1:2, less than 1:3, less than 1:4, less than 1:6, less than 1:8, less than 1:10, or less than 1:20.

In particular embodiments, the volume ratio of the aerogel to thermoplastic polymer in the composite material is less than 5:95 or less than 4:96.

The composite materials may be opaque, transparent, or translucent.

In one specific embodiment, the composite material is opaque.

In another specific embodiment, the composite material is transparent or translucent.

Incorporation of aerogel with the thermoplastic polymer material in a composite material creates a composite material with surprisingly improved thermal conductivity compared to the thermoplastic polymer material. Preferably, the composite material has a thermal conductivity at least 25% lower than (less than 75% of) the thermal conductivity of the thermoplastic polymer material. In particular embodiments, the composite material has a thermal conductivity at least 15%, at least 20%, at least 25%, at least 30%, at least 35%, at least 40%, at least 45%, or at least 50% lower than the thermoplastic polymer material.

Incorporating the aerogel into a thermoplastic polymer also yields a composite material with surprisingly greater pliability and less brittleness, especially at low temperatures. The storage modulus is a measure of stiffness and often relates to brittleness. A decrease in storage modulus indicates increased ductility and decreased brittleness for many plastics. Impact strength is another measure that correlates with ductility and relates inversely to brittleness. It has been shown that as storage modulus or complex modulus (E*), which is the summation of storage modulus (E') and loss modulus (E"), decreases, impact strength increases.

The composite materials of the invention preferably have a storage modulus at 223 K (−50° C.) at least 25% less than (less than 75% of) the storage modulus of the parent thermoplastic polymer material. In particular embodiments, the composite material has a storage modulus at 223 K at least 15%, at least 20%, at least 25%, at least 30%, at least 35%, at least 40%, or at least 50% lower than the thermoplastic polymer material.

The composite material and the parent thermoplastic polymer material preferably do not differ significantly in several other physical characteristics.

In particular embodiments, the composite material and the thermoplastic polymer material both have thermal decomposition temperatures, and the thermal decomposition temperatures of the composite material and the thermoplastic polymer material do not differ by more than 10° C.

In particular embodiments, the composite material and the thermoplastic polymer material each have an ultimate tensile strength, and the ultimate tensile strength of the composite material does not differ by more than 15% from the ultimate tensile strength of the thermoplastic polymer material. In other embodiments, the ultimate tensile strength of the composite material differs by less than 20%, less than 15%, less than 10%, or less than 5% from the ultimate tensile strength of the polymer material.

In particular embodiments, the composite material and the thermoplastic polymer material each have a yield strength, and the yield strength of the composite material does not differ by more than 15% from the yield strength of the polymer material. In other embodiments, the yield strength of the composite material differs by less than 20%, less than 15%, less than 10%, or less than 5% from the yield strength of the polymer material. In other embodiments, the yield strength of the composite material is at least 80%, at least 85%, at least 90%, or at least 95% of the yield strength of the polymer material.

In particular embodiments, the composite material and the thermoplastic polymer material each have a Young's modulus, and the Young's modulus of the composite material does not differ by more than 15% from the Young's modulus of the thermoplastic polymer material. In other embodiments, the Young's modulus of the composite material differs by less than 20%, less than 15%, less than 10%, or less than 5% from the Young's modulus of the polymer material.

Data presented below indicates the yield strength and strain to failure of the composite materials are similar to or higher than the measures in the parent polymeric materials at room temperature.

In some embodiments, the composite material and the thermoplastic polymer material each have a strain to failure, and the strain to failure of the composite material is at least 85%, at least 90%, at least 100%, at least 110%, or at least 120% of the strain to failure of the thermoplastic material.

It has been reported that aerogels can be evacuated of gas and then encased in plastics under vacuum. We have found this is not necessary, or perhaps desirable. Thus, in preferred embodiments of the composite materials, the aerogel is not evacuated of gas.

One embodiment of the composites is wood-thermoplastic polymer-aerogel composites. Another is cellulose-thermoplastic polymer-aerogel composites. Wood-plastic composites are used for weather-resistant outdoor decking planks, as well as for windows, doors, and fencing. A problem with these materials, especially in decking, is that they can be hot to the touch, especially in direct sunlight. By blending aerogels into the materials, the thermal conductivity is decreased so they are more comfortable to touch and better insulators, without harming the physical strength of the materials.

Thus, one embodiment of the invention provides a composite material comprising: an aerogel blended with a thermoplastic polymer material, wherein the thermoplastic polymer material comprises wood or cellulose fibers or particles. Preferably, the weight ratio of the aerogel to the thermoplastic polymer in the composite material is less than 20:100. Preferably the composite material contains at least 20% by weight thermoplastic polymer and at least 20% by weight wood or cellulose fibers or particles. In another embodiment, the composite material contains at least 10% by weight thermoplastic polymer and at least 10% by weight wood or cellulose fibers or particles.

One embodiment of the invention provides a composite material comprising: an aerogel, a thermoplastic polymer, and cellulose or wood particles or fibers; wherein the thermoplastic polymer and cellulose or wood particles or fibers are each at least 10% by weight of the composite material.

The composite materials have reduced thermal conductivity (improved thermal insulation) compared to the base polymers. They are thus suitable for use in articles intended for use at either high or low temperatures. They also have improved ductility and decreased brittleness without sacrificing strength, compared to the base polymers. This makes them particularly suitable for use in articles intended for use at low temperatures.

Thus, in particular embodiments of the articles of manufacture of the invention, the articles are intended for use at low temperatures, e.g., at less than 0° C., less than −50° C., or less than −100° C.

In particular embodiments of the articles of manufacture of the invention, the articles are intended for use at high temperatures, e.g., greater than 100° C., greater than 150° C., or greater than 200° C.

In one embodiment, the articles are seals or gaskets for fluid process systems.

In one embodiment, the articles are pipes, tubes, or containers for transporting or containing fluids or gases.

Another embodiment of the invention provides a use of a composite material comprising (a) an aerogel blended with (b) a thermoplastic polymer material; wherein the weight ratio of the aerogel to thermoplastic polymer in the composite material is less than 20:100; the use comprising incorporating the composite material into an article of manufacture intended for use at high temperatures, e.g., greater than 100° C., greater than 150° C., or greater than 200° C., or intended for use at low temperatures, e.g., less than 0° C., less than −50° C., or less than −100° C.

EXAMPLES

The following examples are intended to illustrate the invention but not limit its scope. In all examples, the aerogel is Cabot NANOGEL, a silica aerogel. NANOGEL beads of approximately 1 mm diameter were used. In these examples, a Brabender MARK II conical twin-screw extruder and PREP CENTER with adjustable temperature zones were used to blend the aerogel and polymer. We believe the twin-screw extruder fractured the aerogel particles to a smaller size. In some experiments, NANOGEL powder of particle size 80 micron particle size was used, and the materials formed were indistinguishable from materials formed with 1 mm NANOGEL particles in all tests.

Comparative Example 1

Virgin MXD6.

Mitsubishi MXD6 pellets were extruded having the four temperature zones heated to 240, 245, 250, and 255° C., respectively. Virgin MXD6 pellets (200 grams) were placed into the feed hopper operating at the appropriate revolutions per minute (rpm) and screw speed of 50 rpm. The extruded material was taken up using a take-up sheet operating between 20 and 50 rpm.

Comparative Example 2

Virgin MXD6 (Polyamide).

Virgin MXD6 pellets (200 grams) were placed into the feed hopper operating at the appropriate rpm and a screw speed of 50 rpm. The four temperature zones were heated to 225, 230, 235, and 240° C., respectively. The extruded material was taken up using a take-up sheet operating at the appropriate rpm.

Example 3

Aerogel-MXD6 Composite.

MXD6 (190 grams) was premixed with 10 grams of Cabot NANOGEL (800 micron). The dry mix was fed into the hopper, keeping temperature profiles and machine speeds identical to the virgin MXD6 in Comparative Example 1. The extruded material was collected using a take-up sheet operating at the appropriate rpm. 10% and 15% aerogel-MXD6 composites were produced under the same conditions using 180 and 170 grams of Mitsubishi MXD6 and 20 and 30 grams of Cabot NANOGEL, respectively.

Comparative Example 4

Virgin ZYTEL (Polyamide).

ZYTEL (400 grams) was extruded with a profile having the four temperature zones heated to 270, 280, 285, and 290° C. The feed hopper was operated at the appropriate rpm and a screw speed of 40 to 60 rpm. The extruded material was collected using a take-up sheet operating at the appropriate rpm.

Example 5

Aerogel-ZYTEL Composite.

ZYTEL (190 grams) was mixed with 10 grams Cabot NANOGEL beads, ~1 mm in size. The extrusion temperature profile zones were at 285, 287, 290, and 295° C., respectively. The feed hopper was operated at the appropriate rpm and a screw speed of 40 to 60 rpm. The extruded material was collected using a take-up roll operating at the appropriate rpm.

Example 6

Aerogel-VERSIFY Polyolefin Composites.

To fabricate the base material, virgin Dow VERSIFY 2300 pellets were fed into the hopper at the appropriate rpm. The temperature zones were 185, 195, 200, 205° C. The extruded material was collected using a take-up sheet operating at the appropriate rpm. In the 5% aerogel-VERSIFY composite, 190 grams of VERSIFY was premixed with 10 grams of Cabot NANOGEL. 10% aerogel-VERSIFY composite was produced under the same conditions with 180 grams VERSIFY and 20 grams NANOGEL, and the 15% aerogel-VERSIFY composite was produced under the same conditions with 170 grams VERSIFY and 30 grams NANOGEL.

VERSIFY 2300 is an extrusion grade polyolefin, a specialty propylene-ethylene copolymer.

Example 7

Aerogel-ULTEM Composite.

ULTEM is a polyetherimide. Virgin ULTEM and ULTEM-aerogel composites were processed as described in Example 3 and Comparative Examples 1 and 2; however, temperature zones were 305, 315, 320 and 325° C. and screw speeds were between 50-70 rpm.

Example 8

Evaluation of the Materials

FIG. 1 shows results of thermogravimetric analysis (TGA) of Dow VERSIFY 2300 and composite materials containing VERSIFY loaded with 5%, 10%, and 15% aerogel. FIG. 1 shows that the decomposition temperature of the material is not changed by the addition of aerogel. It also shows that the actual aerogel content of the materials is less than the amount added to the mixture. It appears the material begins to saturate with aerogel at close to 8% (w/w) aerogel content. The residual mass remaining at 500° C. is a measure of the aerogel content of the composites, since the polymer decomposes below this temperature but the silica aerogel does not. The residual mass at 500° C. is near 0% of the starting mass with the virgin VERSIFY, as expected. It is 4.706% with 5% aerogel, 7.27% with nominal 10% aerogel, and 7.902% with nominal 15% aerogel. Thus, the nominal 15% aerogel composite had almost the same aerogel content as the composite that was nominal 10% aerogel—in both cases between 7 and 8% actual aerogel content. It is expected that with prior mixing with a polymer mixer or batch scale-up, percent loading of aerogel additive could be increased in the polyolefin matrix.

The materials were analyzed by differential scanning calorimetry. This showed that addition of aerogel did not substantially change the glass transition temperature of MXD6. Virgin MXD6 had a glass transition temperature at 49.89° C. and the 15% w/w added aerogel composite had a glass transition temperature at 46.75° C. (data not shown).

The thermal conductivity of samples of MXD6 and aerogel-MXD6 composites were obtained by Netzsch Nanoflash. The Nanoflash measures thermal diffusivity directly, with thermal conductivity calculated as thermal diffusivity multiplied by density multiplied by specific heat. The results are shown in Table 1 with k-value reduction from neat of 47%, 40%, 46%, 30%, and 25%.

TABLE 1

Thermal conductivity of neat polymers and aerogel composite materials.

| Material | Thermal conductivity (W/mK) | Thermal conductivity reduction from neat |
|---|---|---|
| MXD6 neat, sample 1 | 0.217 | |
| 5% aerogel-MXD6, sample 1 | 0.115 | 47% |
| MXD6 neat, sample 2 | 0.294 | |
| 5% aerogel-MXD6, sample 2 | 0.175 | 40% |
| ULTEM neat | 0.335 | |
| 5% aerogel-ULTEM | 0.182 | 46% |
| PA66 neat | 0.454 | |
| 5% aerogel-PA66 | 0.320 | 30% |
| PA66 neat | 0.292 | |
| 5% aerogel-PA66 | 0.216 | 26% |

A diffusivity method such as Nanoflash does not work well for transparent materials like the VERSIFY composites. A new methodology was developed using a cup-cryostat apparatus to measure relative apparent thermal conductivity of the VERSIFY composites based on the boil-off rate of liquid nitrogen. The warm boundary temperature was approximately 280 K and the cold boundary temperature was approximately 78 K. The mean temperature was approximately 179 K. The comparative k values are shown in Table 2, with k-value reduction from neat of 22%.

TABLE 2

Comparative k values for composites.

| Material | Thickness (inches) | Boil-off Rate (g/min) | Comparative k value (W/m-K) | Thermal conductivity reduction from neat |
|---|---|---|---|---|
| VERSIFY neat | 0.311 | 4.403 | 0.124 | |
| 5% aerogel-VERSIFY | 0.253 | 4.184 | 0.096 | 22% |

Figure 2:
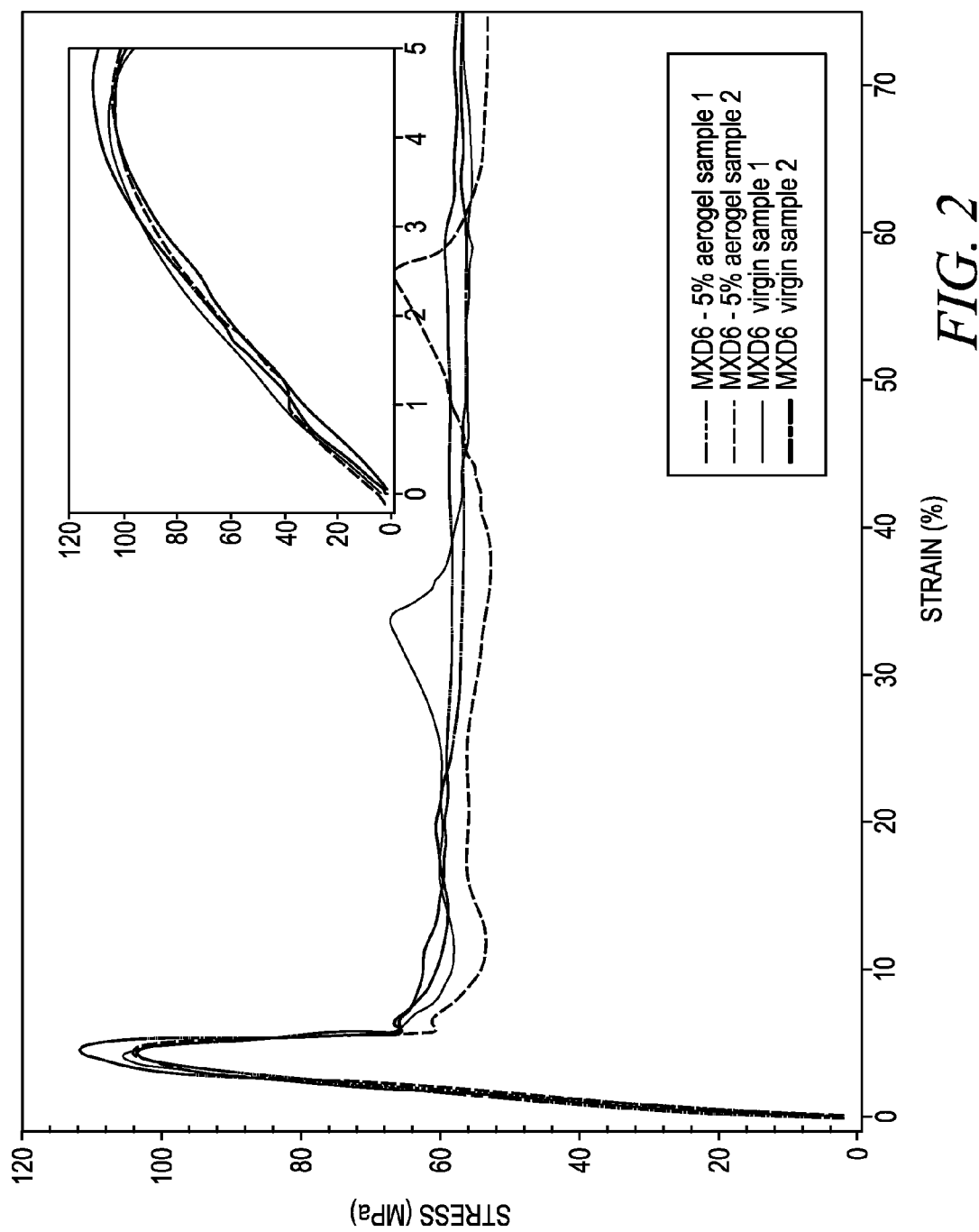
FIG. 2 shows results of tensile tests of neat MXD6 and MXD6 containing 5% aerogel.

FIG. 2 shows the results of a tensile tests of virgin Mitsubishi MXD6 and a composite material containing 5% Cabot NANOGEL aerogel loaded in MXD6 (w/w). Tensile tests measure the yield strength, ultimate tensile strength, Young's modulus, and strain to failure of the materials. The yield strength of the materials is synonymous with the yield strength and is the peak value of the stress in the inset graph of the elastic deformation of the material, at about 4% strain, before plastic deformation occurs after 4% strain. The Young's modulus is the slope of stress/strain in the elastic deformation portion of the curve. The strain to failure is the strain at which the materials ultimately fail, which is above about 150% in all cases in FIG. 2. The ultimate tensile strength is the highest stress measured in the curves. FIG. 2 shows that the Young's modulus and yield strength of MXD6 containing 5% aerogel are similar to the values for virgin MXD6. The strain to failure of the composite materials is similar to or somewhat larger than the strain to failure of virgin MXD6.

Table 3 shows the yield stress and strain of MXD6 and 5% aerogel-MXD6 composites averaged over several samples.

TABLE 3

Yield stress and strain of MXD6 and aerogel composite.

| Material | yield stress (psi) | yield strain (%) |
|---|---|---|
| MXD6 neat | 97.0 ± 11.3 | 4.1% |
| MXD6-5% aerogel | 99.3 ± 8.2 | 4.1% |

Table 4 shows the yield stress and strain of VERSIFY and VERSIFY-5% aerogel composite averaged over several samples.

TABLE 4

Yield stress and strain of VERSIFY and aerogel composite.

| Material | Young's Modulus (Mpa) | Yield Stress (MPa) | Yield Strain |
|---|---|---|---|
| VERSIFY 2300 neat | 17.11 | 15.31 ± 5.23 | 7.84 ± 1.09 |
| VERSIFY 2300-5% aerogel | 17.66 | 12.89 ± 2.37 | 7.42 ± 0.61 |

Figure 3:
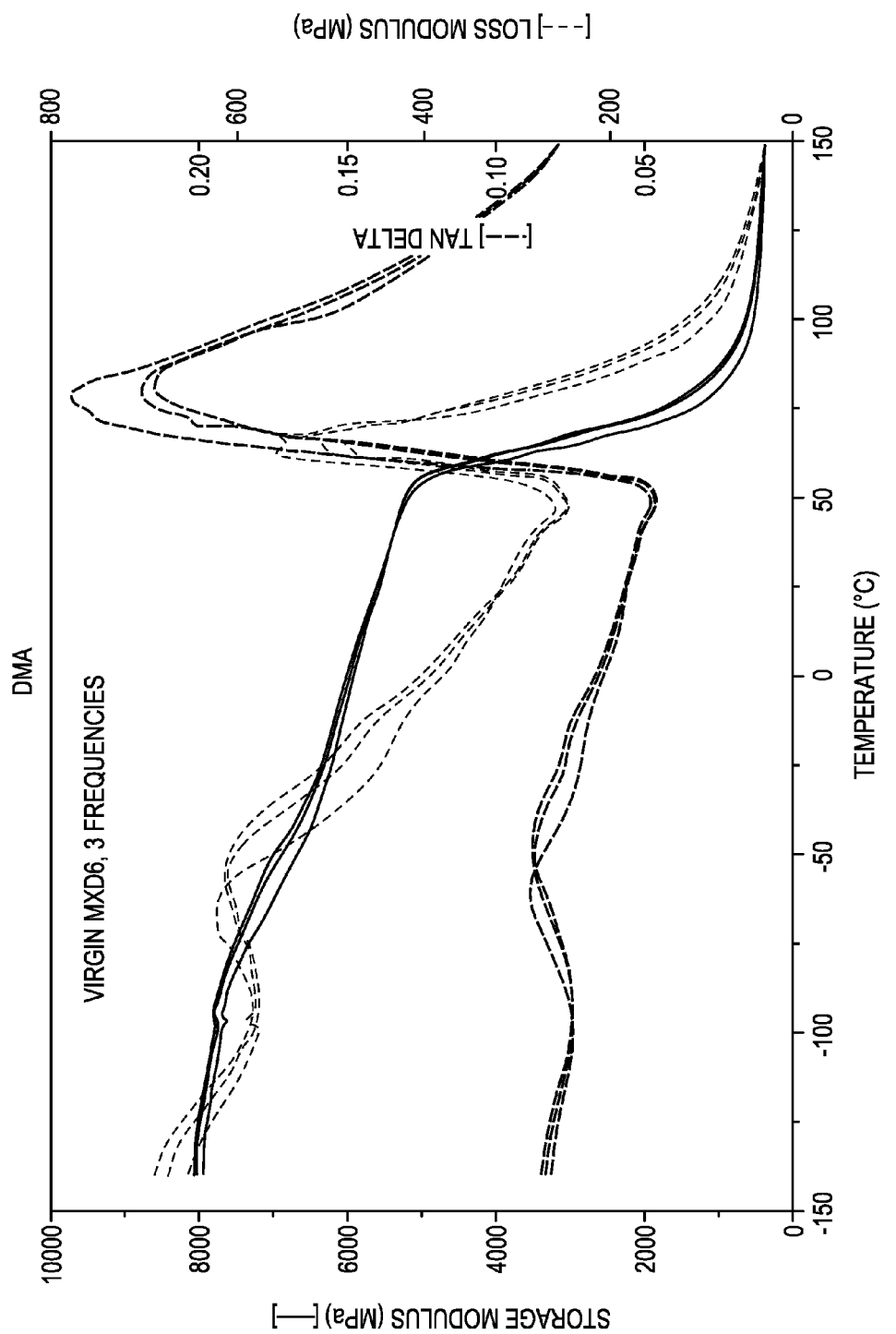
FIG. 3 is a graph showing results of dynamic mechanical analysis (DMA) of neat MXD6.
Figure 4:
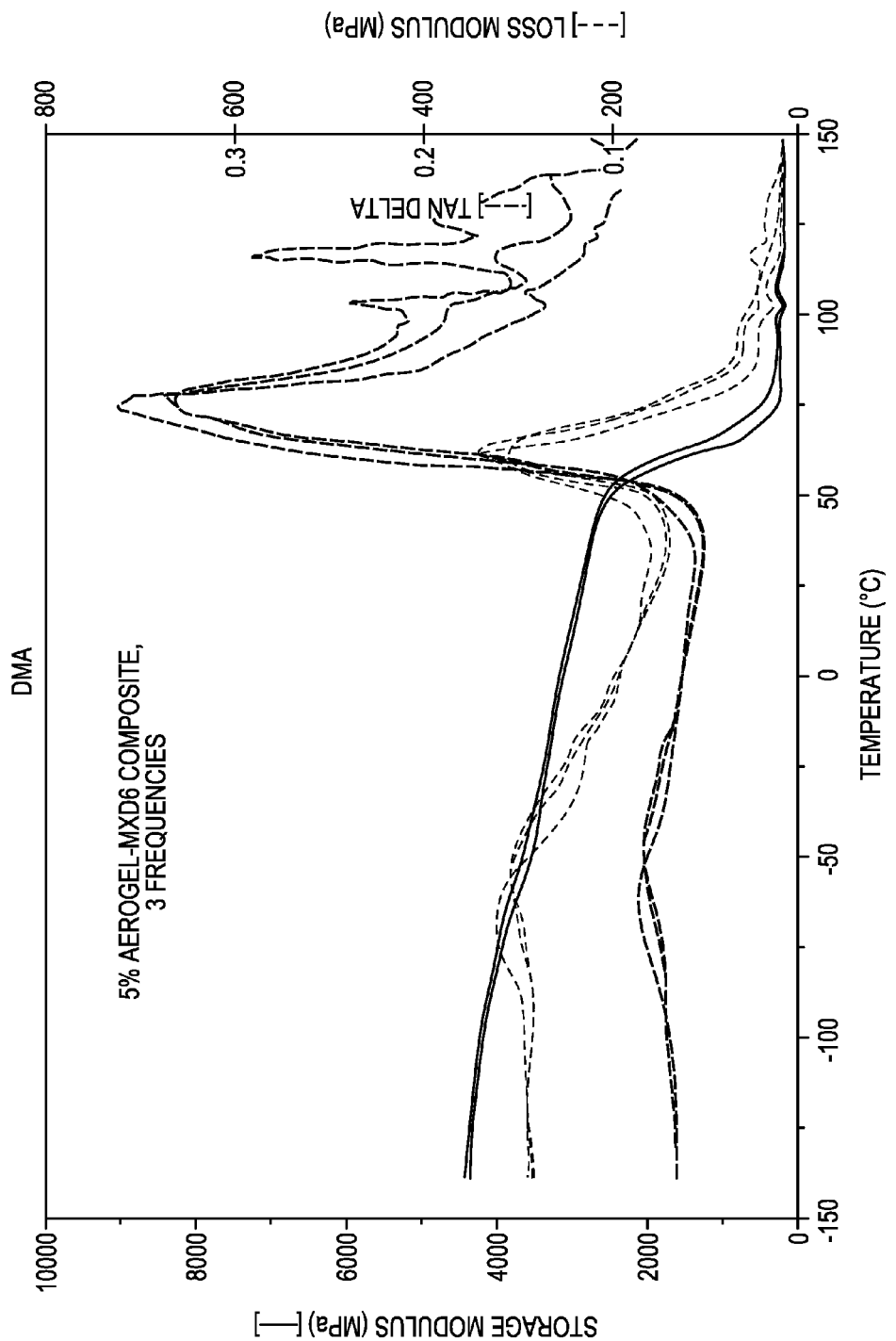
FIG. 4 is a graph showing results of DMA of MXD6 loaded with 5% aerogel.
Figure 5:
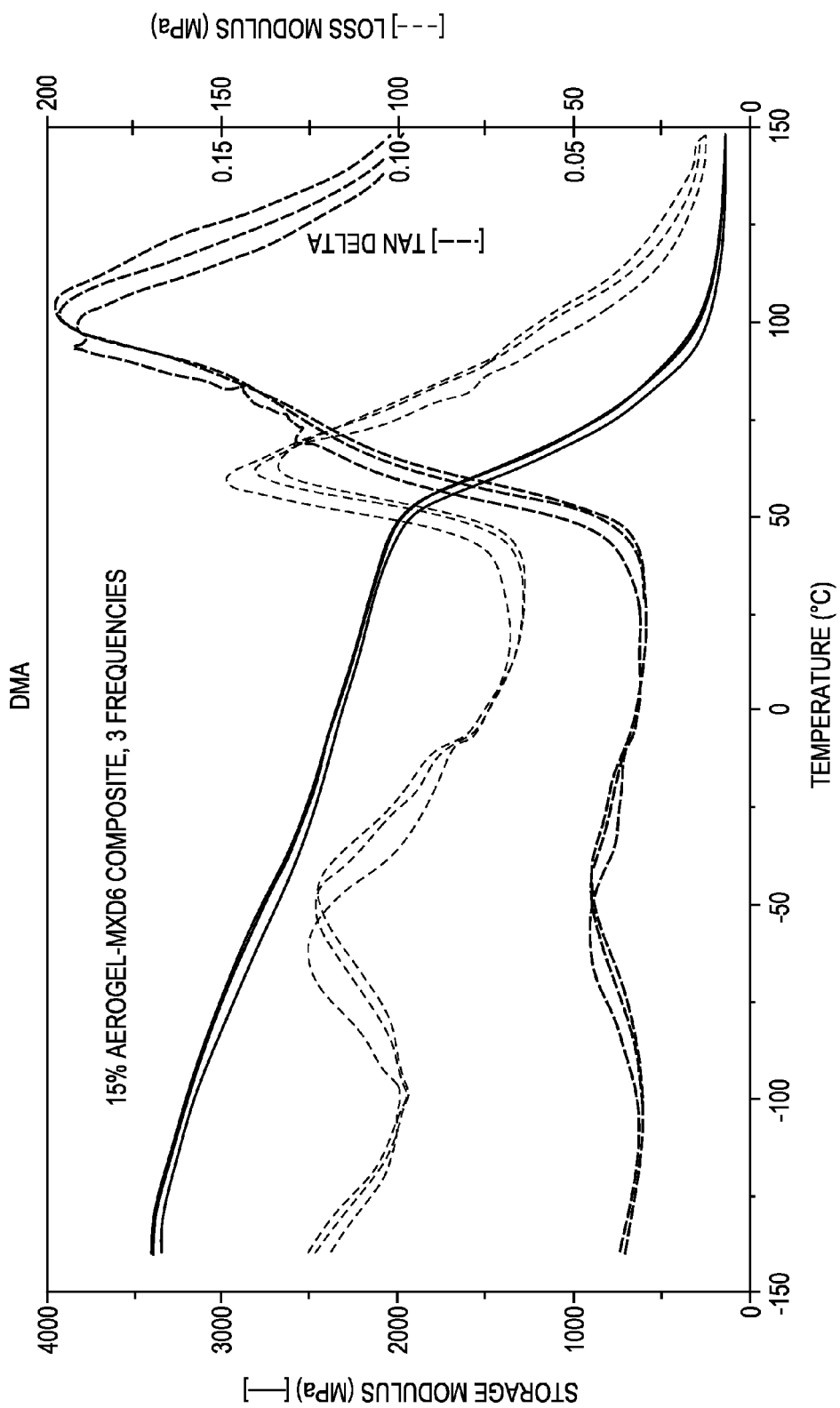
FIG. 5 is a graph showing results of DMA of MXD6 loaded with 15% aerogel.

FIGS. 3-5 show the results of dynamic mechanical analysis (DMA) of virgin MXD6, MXD6 5% w/w aerogel added, and MXD6 with 15% w/w aerogel added. The DMA test produces measurements of storage modulus, loss modulus, and tan delta. Comparison of FIG. 4 with FIG. 3 shows addition of 5% aerogel to MXD6 reduces the storage modulus of the material by about 40%. Increasing the aerogel addition amount to 15% reduces the storage modulus further. But the difference in storage modulus between the 15% aerogel and 5% aerogel composite materials is smaller than the difference in storage modulus between the 5% aerogel composite and virgin MXD6. This may be because the nominal 15% aerogel composite actually contained less aerogel than this, as discussed above with the thermogravimetric analysis.

Figure 6:
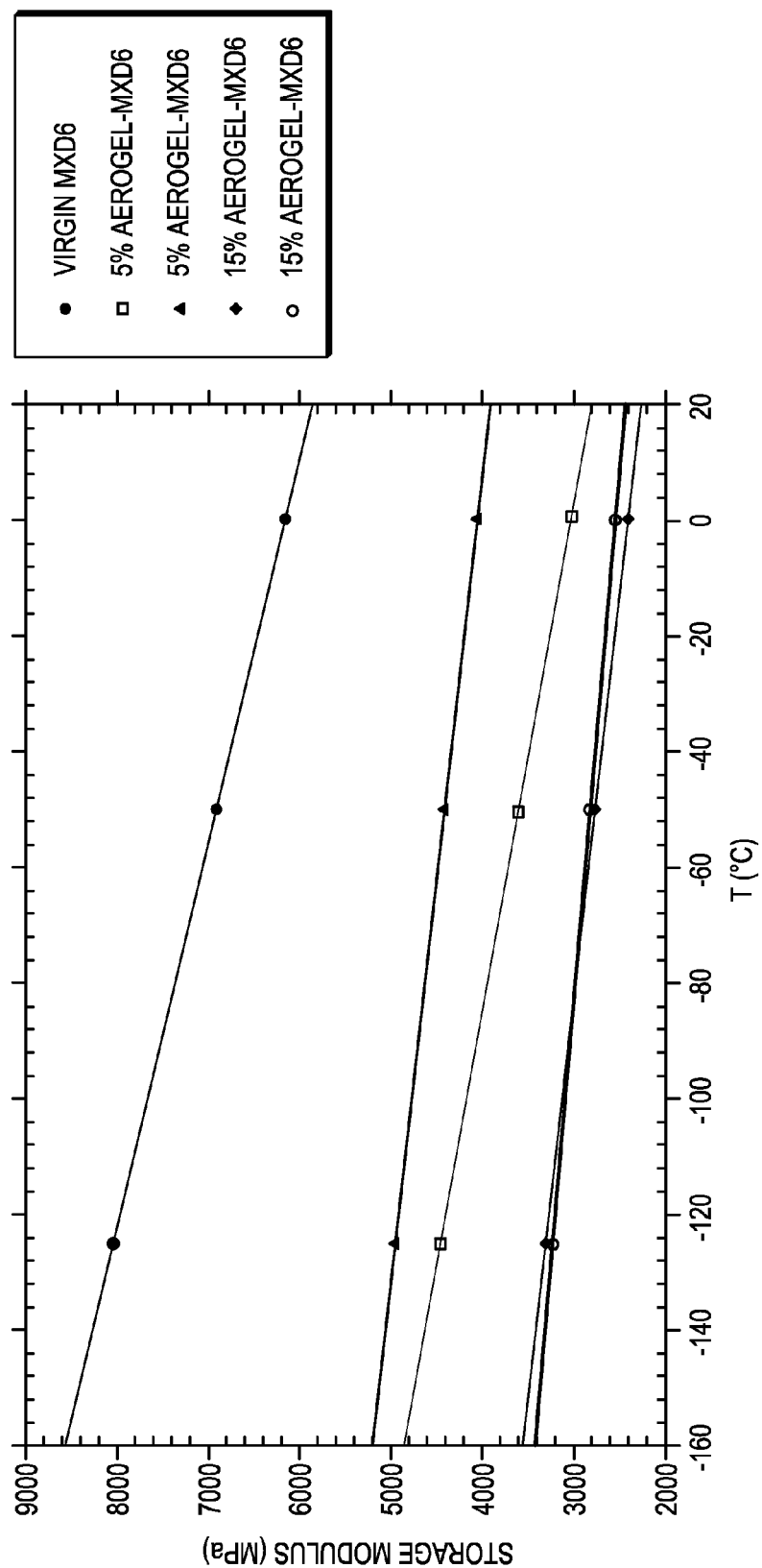
FIG. 6 is a plot of storage modulus versus temperature for neat MXD6 and four samples of 5% or 15% aerogel-MXD6 composites.

FIG. 6 is a plot of the storage modulus of the three materials versus temperature. It shows that the difference in storage modulus between the aerogel composites and the virgin material is more pronounced at lower temperatures. This means the composite materials have decreased stiffness and brittleness compared to virgin MXD6 at cryogenic temperatures.

The storage modulus of neat MXD6 and ULTEM and aerogel composites are shown in numeric format in Table 5.

TABLE 5

Storage modulus of plastics and aerogel composites at −125° C. from DMA 3-point bend data.

| Material | Storage modulus at −125° C. (MPa) | Frequency (Hz) |
|---|---|---|
| MXD6 neat | 7976 ± 65 | 1, 5.5, 10 |
| 5% aerogel-MXD6 | 4582 ± 228 | 1, 5.5, 10 |
| 15% aerogel-MXD6 | 3321 ± 35 | 1, 5.5, 10 |

TABLE 5-continued

Storage modulus of plastics and aerogel composites at −125° C. from DMA 3-point bend data.

| Material | Storage modulus at −125° C. (MPa) | Frequency (Hz) |
|---|---|---|
| ULTEM neat | 4053 ± 17 | 1, 4, 10 |
| 5% aerogel-ULTEM | 1352 ± 53 | 1, 4, 10 |

All patents and references cited are incorporated herein by reference.

What is claimed is:

1. An article of manufacture comprising:
a composite material comprising (a) an aerogel blended with (b) a thermoplastic polymer material; wherein the weight ratio of the aerogel to thermoplastic polymer in the composite material is less than 20:100; and wherein the composite material has a thermal conductivity less than 75% of the thermal conductivity of the thermoplastic polymer material and has a yield strength that differs by no more than 15% from the yield strength of the thermoplastic polymer material;
wherein the article is a seal, gasket, pipe, tube, or container for transporting or containing fluids or gases and is adapted for use at temperatures greater than 100° C.; and wherein the thermoplastic polymer is not a polyolefin.

2. The article of claim 1 wherein the article is adapted for use at temperatures greater than 200° C.

3. The article of claim 1 wherein the composite material has a thermal conductivity less than 60% of the thermal conductivity of the polymer material.

4. The article of claim 1 wherein the polymer material comprises nylon.

5. The article of claim 1 wherein the polymer material comprises a polystyrene, a polyester, a polyamide, a polyether, a polyurethane, an acrylic polymer, a polyimide, a polyurea, a polypyrrole, a polythiophene, a polyaniline, an acrylic polymer, a vinyl polymer, a polysiloxane, a polysulfide, a polycarbonate, or copolymers or mixtures thereof.

6. The article of claim 1 wherein the composite material has a yield strength that is at least 95% of the yield strength of the thermoplastic polymer material.

7. The article of claim 1 wherein the aerogel is a silica aerogel.

8. An article of manufacture comprising:
a composite material comprising (a) an aerogel blended with (b) a thermoplastic polymer material; wherein the weight ratio of the aerogel to thermoplastic polymer in the composite material is less than 20:100;
wherein the composite material and the polymer material each have a storage modulus, and the storage modulus of the composite material at 223 K is less than 75% of the storage modulus of the polymer material at 223 K;
wherein the article is adapted for use at temperatures less than 0° C.; and wherein the volume ratio of the aerogel to the thermoplastic polymer material in the composite material is not less than 1:10;
wherein the article is a food package or a storage container, or a seal, gasket, pipe, tube, or container for transporting or containing fluids or gases.

9. The article of claim 8 wherein the composite material is adapted for use at temperatures less than −50° C.

10. The article of claim 8 wherein the composite material is adapted for use at temperatures less than −100° C.

11. The article of claim 8 wherein the and wherein the composite material has a thermal conductivity less than 75% of the thermal conductivity of the thermoplastic polymer material and has a yield strength that differs by no more than 15% from the yield strength of the thermoplastic polymer material.

12. The article of claim 8 wherein the polymer material comprises nylon.

13. The article of claim 8 wherein the polymer material comprises a polyolefin, a polystyrene, a polyester, a polyamide, a polyether, a polyurethane, an acrylic polymer, a polyimide, a polyurea, a polypyrrole, a polythiophene, a polyaniline, an acrylic polymer, a vinyl polymer, a polysiloxane, a polysulfide, a polycarbonate, or copolymers or mixtures thereof.

14. The article of claim 8 wherein the thermoplastic polymer is not a polyolefin.

15. The article of claim 8 wherein the aerogel is a silica aerogel.

* * * * *